(12) United States Patent
Yoshida et al.

(10) Patent No.: US 12,555,930 B2
(45) Date of Patent: Feb. 17, 2026

(54) MEMBER-JOINED STRUCTURE, BATTERY MODULE, AND BATTERY PACK

(71) Applicant: Prime Planet Energy & Solutions, Inc., Tokyo (JP)

(72) Inventors: Takashi Yoshida, Kakogawa (JP); Tomomi Tanaka, Moriguchi (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 527 days.

(21) Appl. No.: 18/097,287

(22) Filed: Jan. 16, 2023

(65) Prior Publication Data

US 2023/0231325 A1 Jul. 20, 2023

(30) Foreign Application Priority Data

Jan. 17, 2022 (JP) ................................ 2022-005055

(51) Int. Cl.
| | | |
|---|---|---|
| *H01R 4/02* | (2006.01) | |
| *H01M 50/503* | (2021.01) | |
| *H01M 50/507* | (2021.01) | |
| *H01M 50/516* | (2021.01) | |

(52) U.S. Cl.
CPC .......... *H01R 4/029* (2013.01); *H01M 50/503* (2021.01); *H01M 50/507* (2021.01); *H01M 50/516* (2021.01)

(58) Field of Classification Search
None
See application file for complete search history.

(56) References Cited

U.S. PATENT DOCUMENTS

| | | |
|---|---|---|
| 2015/0243947 A1 | 8/2015 | Seto et al. |
| 2015/0270525 A1* | 9/2015 | Jeong ................. H01M 50/503 429/153 |
| 2017/0365827 A1 | 12/2017 | Okada et al. |
| 2018/0117714 A1 | 5/2018 | Scherer et al. |
| 2018/0294465 A1 | 10/2018 | Nagai et al. |
| 2019/0291216 A1 | 9/2019 | Kikuchi et al. |
| 2019/0305390 A1 | 10/2019 | Asakura et al. |
| 2020/0274133 A1 | 8/2020 | Masumura et al. |
| 2021/0203040 A1 | 7/2021 | Okada et al. |
| 2021/0226304 A1 | 7/2021 | Suzuki |
| 2021/0384592 A1 | 12/2021 | Urano et al. |

FOREIGN PATENT DOCUMENTS

| | | |
|---|---|---|
| CN | 108695457 A | 10/2018 |
| EP | 3409410 A1 | 12/2018 |
| EP | 3922397 A1 | 12/2021 |
| JP | 2002079387 A | 3/2002 |
| JP | 2010158717 A | 7/2010 |

(Continued)

*Primary Examiner* — Eli S Mekhlin
(74) *Attorney, Agent, or Firm* — HAUPTMAN HAM, LLP

(57) ABSTRACT

A member-joined structure includes: a first member, and a second member having a shape of plate, the second member including an overlapping portion that overlaps with the first member and a protruding portion that protrudes from the overlapping portion along a first direction. In the overlapping portion, a joined portion in which the first member and the second member are joined to each other by welding or fusing is formed. The joined portion is provided with a notch portion located opposite to the protruding portion.

17 Claims, 6 Drawing Sheets

(56) References Cited

FOREIGN PATENT DOCUMENTS

| | | |
|---|---|---|
| JP | 2018-181552 A | 11/2018 |
| JP | 2019-179595 A | 10/2019 |
| WO | 2014/064888 A1 | 5/2014 |
| WO | 2016/157268 A1 | 10/2016 |
| WO | 2017/141296 A1 | 8/2017 |
| WO | 2017131186 A1 | 8/2017 |

* cited by examiner

MEMBER-JOINED STRUCTURE, BATTERY MODULE, AND BATTERY PACK

This nonprovisional application is based on Japanese Patent Application No. 2022-005055 filed on Jan. 17, 2022 with the Japan Patent Office, the entire contents of which are hereby incorporated by reference.

BACKGROUND OF THE INVENTION

Field of the Invention

The present technology relates to a member-joined structure, a battery module, and a battery pack.

Description of the Background Art

Conventionally, a plurality of members are stacked and joined together by welding or the like Examples of a conventional lap joint structure include those described in WO 2017/131186, Japanese Patent Laying-Open No. 2010-158717, and Japanese Patent Laying-Open No. 2002-079387.

SUMMARY OF THE INVENTION

In order to increase joining strength, there is a demand to attain a large area of a joined portion formed by welding or fusing. On the other hand, in view of such a concern that an influence of heat (accumulation of heat) due to welding or fusing may lead to insufficient joining such as cracking, there is also a demand to attain a small area of the joined portion as much as possible. It cannot be necessarily said that the conventional lap joint structure is sufficient in satisfying the above-described two contradictory demands.

It is an object of the present technology to provide a member-joined structure, a battery module, and a battery pack so as to reduce an influence of heat during joining while securing joining strength.

A member-joined structure according to the present technology includes: a first member; a second member having a shape of plate, the second member including an overlapping portion that overlaps with the first member and a protruding portion that protrudes from the overlapping portion along a first direction. In the overlapping portion, a joined portion in which the first member and the second member are joined to each other by welding or fusing is formed. The joined portion is provided with a notch portion located opposite to the protruding portion.

A battery module according to the present technology includes: a battery cell including an electrode terminal serving as the first member; and a bus bar serving as the second member, wherein the above-described member-joined structure is included as a structure in which the electrode terminal and the bus bar are joined to each other.

A battery pack according to the present technology includes: a case; and the above-described battery module accommodated in the case.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
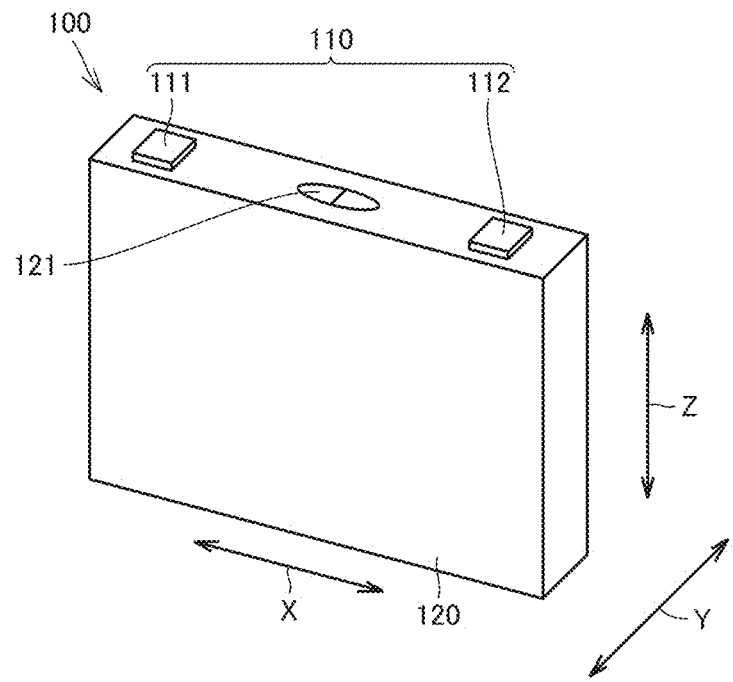
FIG. 1 is a perspective view showing a battery cell.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

FIG. 1 is a perspective view showing a battery cell 100. As shown in FIG. 1, battery cell 100 is formed to have a flat rectangular parallelepiped shape. In a battery pack, battery cells 100 are stacked in a Y axis direction (first direction).

Electrode terminals 110 include a positive electrode terminal 111 and a negative electrode terminal 112. Positive electrode terminal 111 and negative electrode terminal 112 are arranged side by side in an X axis direction (second direction). Each of electrode terminals 110 is formed on an upper surface of a housing 120 having a prismatic shape.

Each of the top surface and bottom surface of housing 120 facing each other along a Z axis direction (third direction) has a substantially rectangular shape in which the X axis direction corresponds to a long side direction and the Y axis direction corresponds to a short side direction. Housing 120 accommodates an electrode assembly and an electrolyte solution. A gas-discharge valve 121 is provided in the upper surface of housing 120. When pressure in housing 120 is increased, gas-discharge valve 121 is opened to discharge the gas in housing 120.

It should be noted that the battery cell according to the present technology is not necessarily limited to such a prismatic battery cell 100, and the member-joined structure according to the present technology can be also applied to, for example, a cylindrical battery cell.

Figure 2:
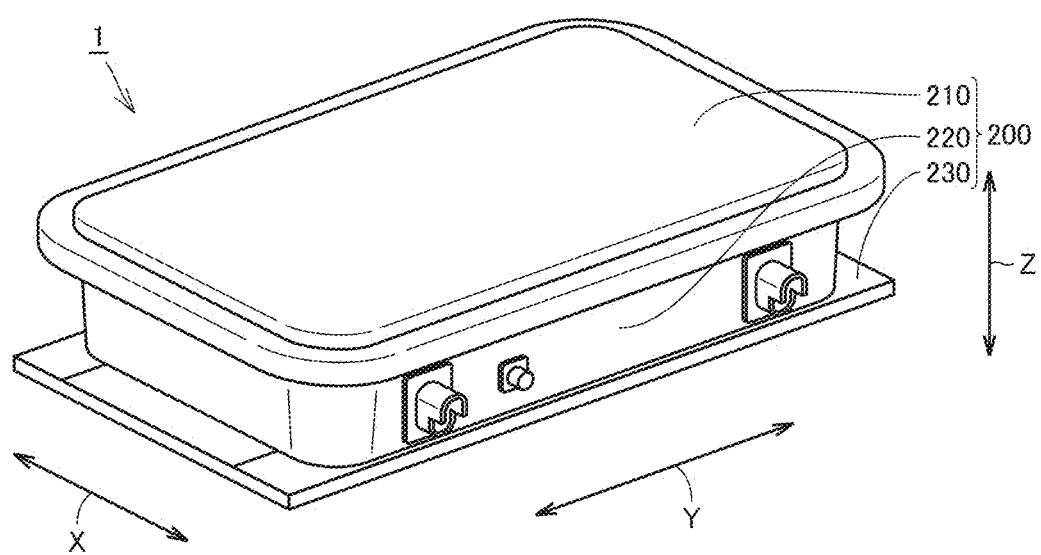
FIG. 2 is an external view of a case that accommodates a battery module including the battery cell.

FIG. 2 is an external view of a battery pack 1. As shown in FIG. 2, battery pack 1 includes a case 200. Case 200 includes a cover 210, a main body 220, and a cooling plate 230. Cover 210, main body 220, and cooling plate 230 constitute a structural member for securing strength of case 200.

Figure 3:
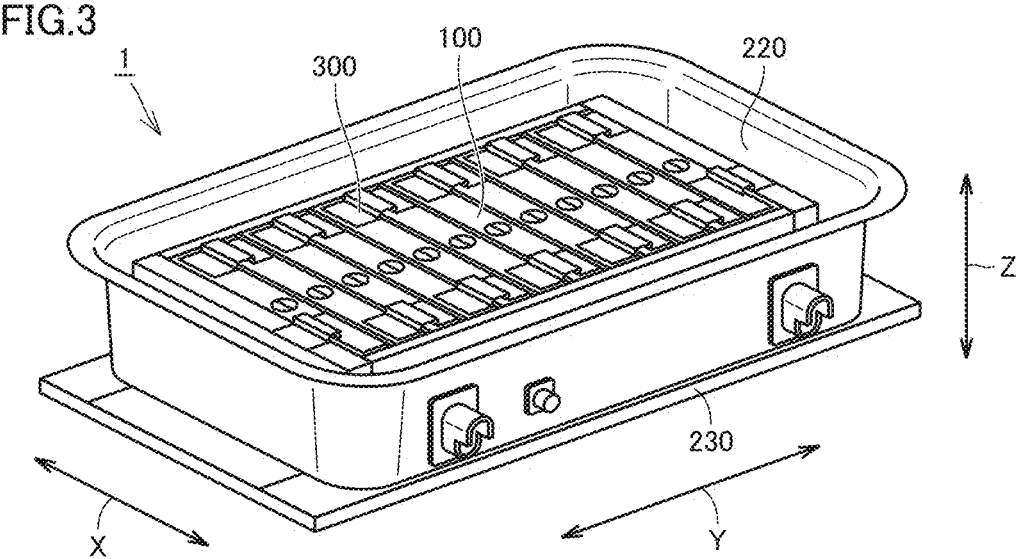
FIG. 3 is a perspective view showing inside of the case.
Figure 4:
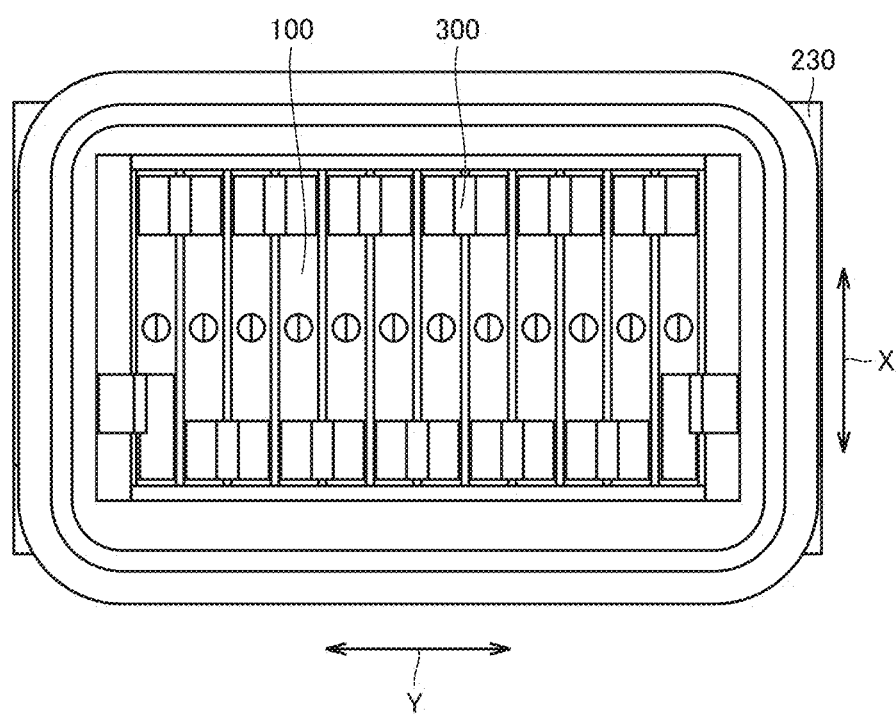
FIG. 4 is a top view showing the inside of the case.

FIG. 3 is a perspective view showing inside of case 200, and FIG. 4 is a top view showing the inside of case 200. As shown in FIGS. 3 and 4, a battery module constituted of a plurality of battery cells 100 is accommodated in an inner space of case 200. The plurality of battery cells 100 are arranged along the Y axis direction (first direction). The plurality of battery cells 100 are accommodated in the inner space of case 200 with the plurality of battery cells 100 being restrained in the Y axis direction. The plurality of battery cells 100 are electrically connected to each other by bus bars 300.

Figure 5:
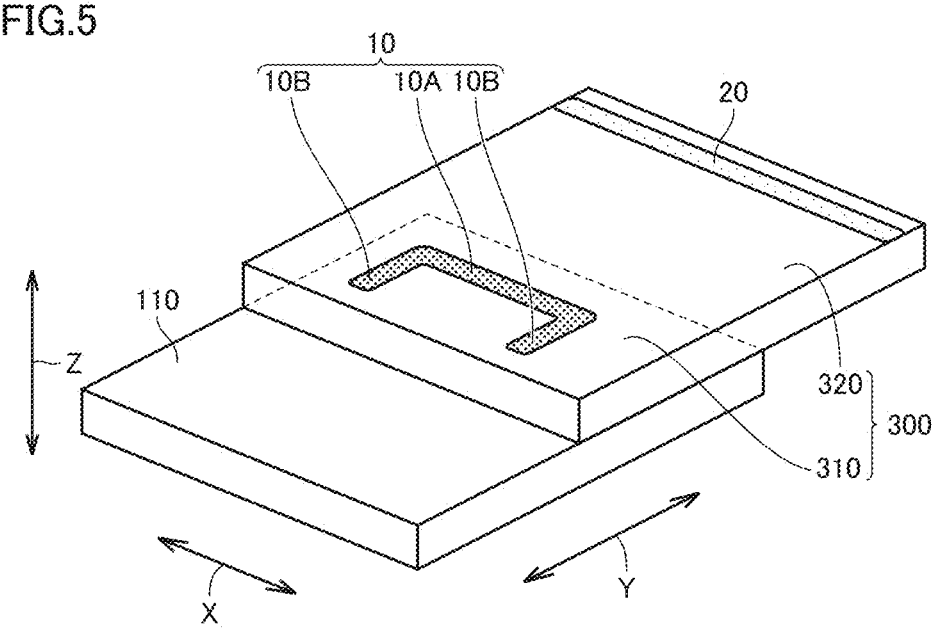
FIG. 5 is a perspective view showing a structure in which an electrode terminal and a bus bar are joined to each other.

FIG. 5 is a perspective view showing a structure in which electrode terminal 110 (first member) and bus bar 300 (second member) are joined to each other. As shown in FIG. 5, bus bar 300 includes: an overlapping portion 310 that overlaps with electrode terminal 110; and a protruding portion 320 that protrudes from overlapping portion 310 along the Y axis direction.

In overlapping portion 310, a joined portion 10 in which electrode terminal 110 and bus bar 300 are joined to each other is formed. Electrode terminal 110 and bus bar 300 are joined by welding or fusing. As a specific example, joined portion 10 is formed by laser welding or ultrasonic joining; however, the method of forming joined portion 10 is not limited thereto.

Joined portion 10 is formed to have a substantially C shape so as to include a first portion 10A and second portions 10B.

First portion 10A extends in a direction intersecting with the Y axis direction. More specifically, in the example shown in FIG. 5, first portion 10A extends in the X axis direction orthogonal to the Y axis direction. First portion 10A may be divided into a plurality of portions.

Second portions 10B extend in the Y axis direction from both ends of first portion 10A toward a side opposite to protruding portion 320.

In protruding portion 320, there is a hypothetical force-applied point 20. Force in any direction can act on force-applied point 20. For example, when the positions of electrode terminals 110 of adjacent battery cells 100 are displaced from each other in the Z axis direction, force in the Z axis direction can act on force-applied point 20. When force in the Z axis direction acts on force-applied point 20, force in a detachment direction acts on joined portion 10 of overlapping portion 310. When force in the X axis direction or the Y axis direction acts on force-applied point 20, force in a shearing direction acts on joined portion 10 of overlapping portion 310.

Figure 6:
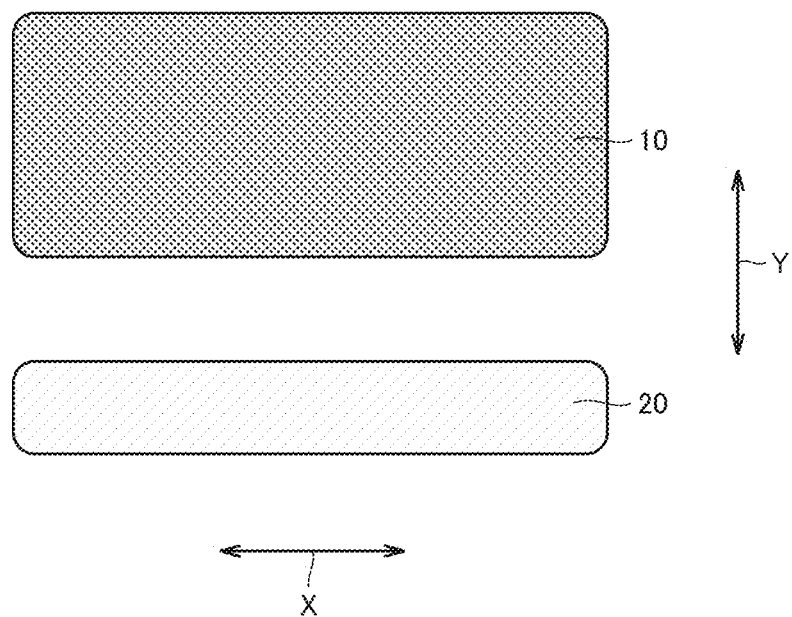
FIG. 6 is a first diagram showing a positional relation between a joined portion and a force-applied point.
Figure 7:
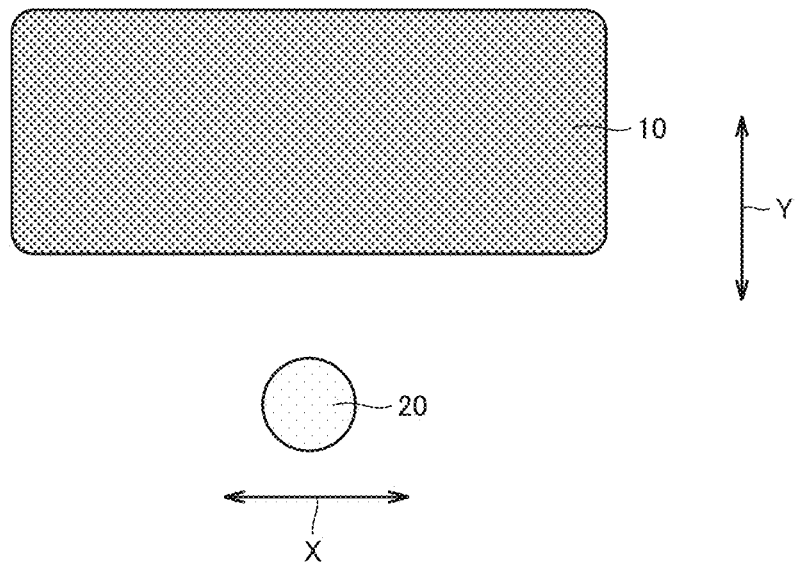
FIG. 7 is a second diagram showing the positional relation between the joined portion and the force-applied point.
Figure 8:
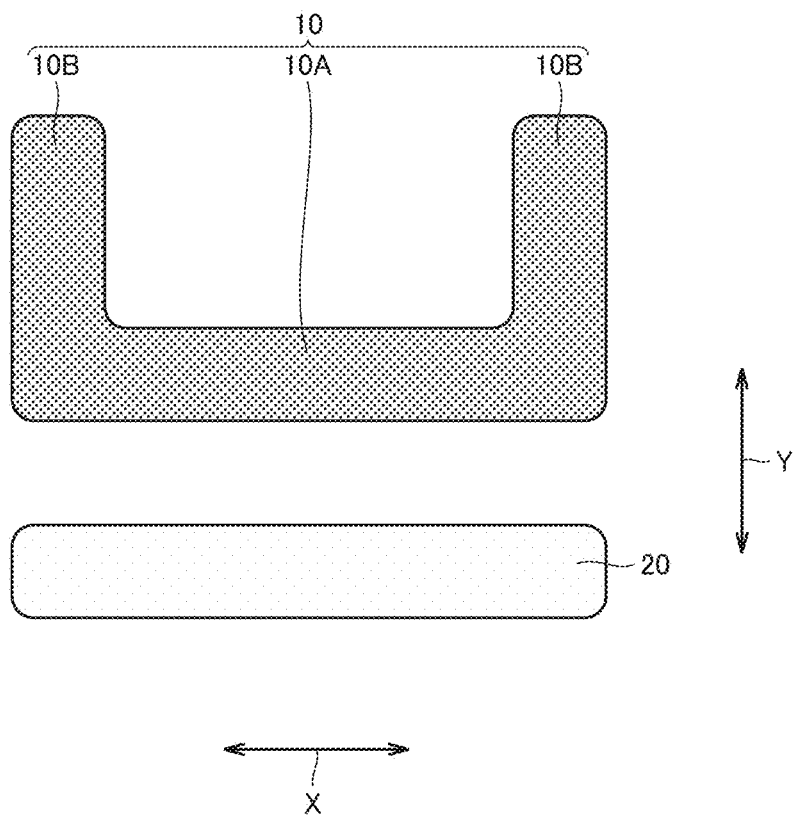
FIG. 8 is a third diagram showing the positional relation between the joined portion and the force-applied point.
Figure 9:
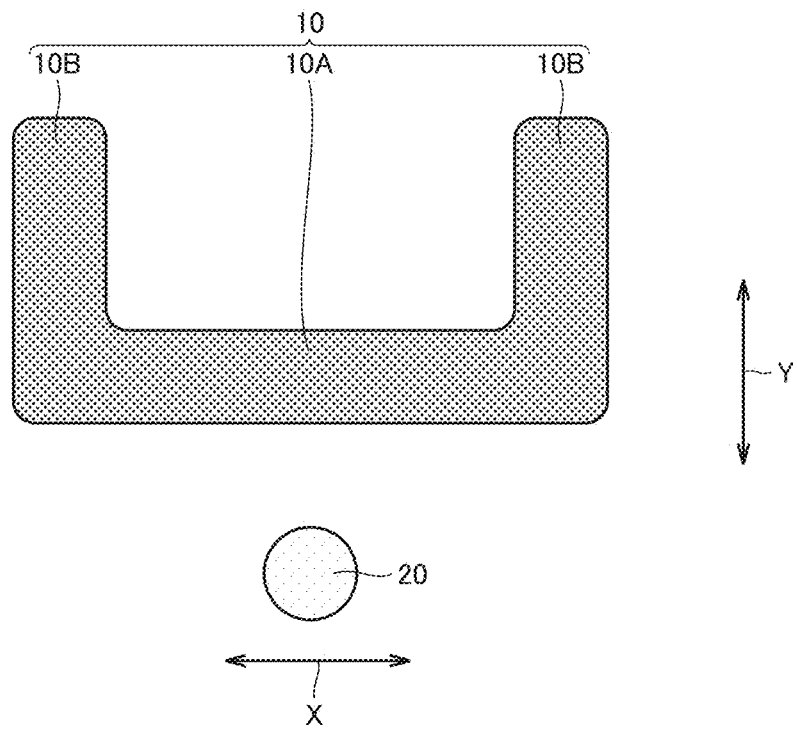
FIG. 9 is a fourth diagram showing the positional relation between the joined portion and the force-applied point.
Figure 10:
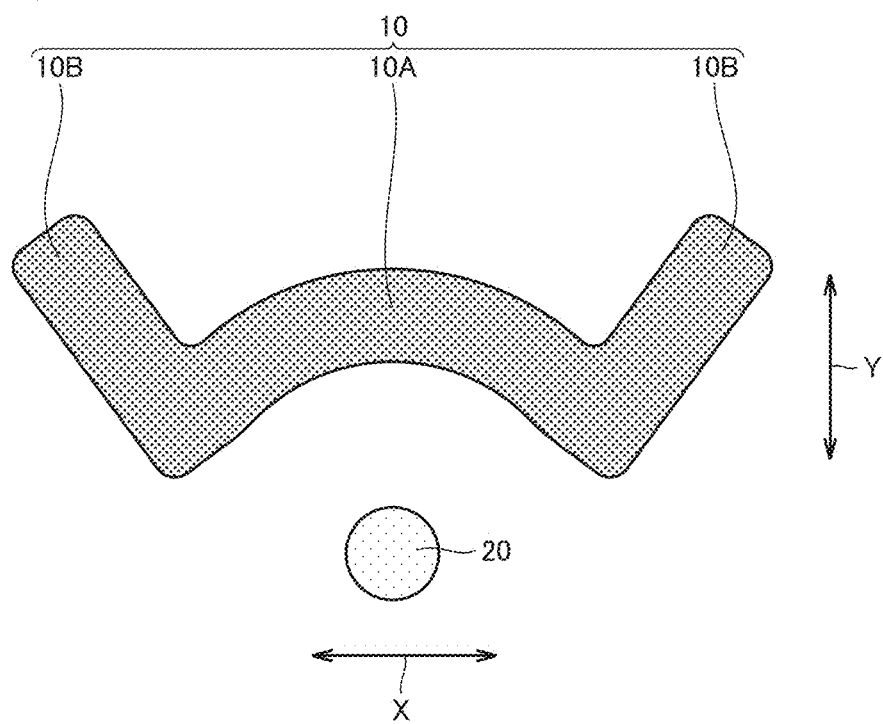
FIG. 10 is a fifth diagram showing the positional relation between the joined portion and the force-applied point.

Each of FIGS. 6 to 10 shows an exemplary positional relation between joined portion 10 and the force-applied point. Each of FIGS. 6 and 7 show a joined portion 10 according to a comparative example, and each of FIGS. 8 to 10 shows a joined portion 10 according to an example of the present embodiment.

As shown in FIGS. 6 to 10, a force-applied point 20 in the form of a strip (FIGS. 6 and 8) and a force-applied point 20 in the form of a dot (FIGS. 7, 9, and 10) can be considered as hypothetical force-applied point 20.

In each of the comparative examples shown in FIGS. 6 and 7, a joined portion 10 having a substantially rectangular shape is formed. In each of the examples shown in FIGS. 8 and 9, a joined portion 10 having a substantially C-shape includes: a first portion 10A extending in the X axis direction; and second portions 10B extending in the Y axis direction from both ends of first portion 10A toward a side opposite to force-applied point 20. In a modification shown in FIG. 10, a joined portion 10 having a substantially C-shape includes: a first portion 10A that has a curved (arc) shape and that faces force-applied point 20; and second portions 10B extending from both ends of first portion 10A toward a side opposite to force-applied point 20.

In order to increase joining strength of joined portion 10, there is a demand to attain a large area of joined portion 10 as much as possible as in the comparative examples shown in FIGS. 6 and 7. On the other hand, in view of such a concern that an influence of heat (accumulation of heat) due to formation of joined portion 10 may lead to insufficient joining such as generation of crack in joined portion 10, there is also a demand to attain a small area of joined portion 10 as much as possible. Joined portion 10 is required to have a structure that satisfies the above-described two demands, which may be contradictory to each other.

Since joined portion 10 according to each of the examples shown in FIGS. 8 and 9 includes first portion 10A extending in the X axis direction and second portions 10B extending in the Y axis direction, required joining strength can be secured with respect to shear loads in the X axis direction and the Y axis direction. Further, by providing first portion 10A on the side close to force-applied point 20, joined portion 10 can be selectively provided at a position at which stress when a load acts on force-applied point 20 is relatively high. In other words, the influence of heat upon formation of joined portion 10 can be effectively reduced while suppressing decreased joining strength. By reducing the influence of heat, insufficient joining can be suppressed from occurring due to residual strain in joined portion 10. Regarding these points, the same applies to joined portion 10 according to the modification shown in FIG. 10.

Next, an exemplary shape of joined portion 10 will be described with reference to FIGS. 11 and 12. In each of the examples shown in FIGS. 11 and 12, a notch portion 10C is formed opposite to protruding portion 320 and force-applied point 20. An area of a region surrounded by notch portion 10C (region surrounded by a chain double-dashed line shown in each of FIGS. 11 and 12 and a contour of joined portion 10) is smaller than an area of joined portion 10.

By providing notch portion 10C opposite to protruding portion 320 and force-applied point 20, joined portion 10 can be selectively provided at a position at which stress when a load acts on force-applied point 20 is relatively high. In other words, the influence of heat upon formation of joined portion 10 can be effectively reduced while suppressing decreased joining strength. By reducing the influence of heat, insufficient joining can be suppressed from occurring due to residual strain in joined portion 10.

Figure 11:
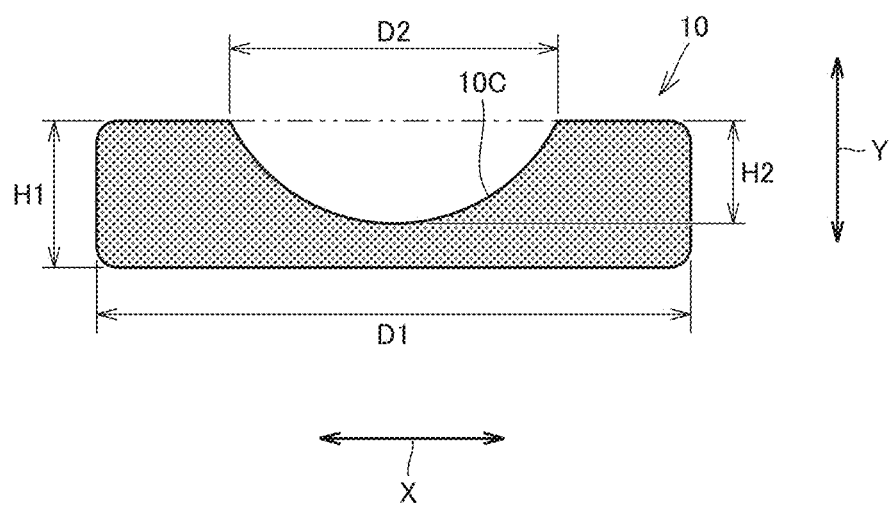
FIG. 11 is a first diagram for illustrating a shape of the joined portion.
Figure 12:
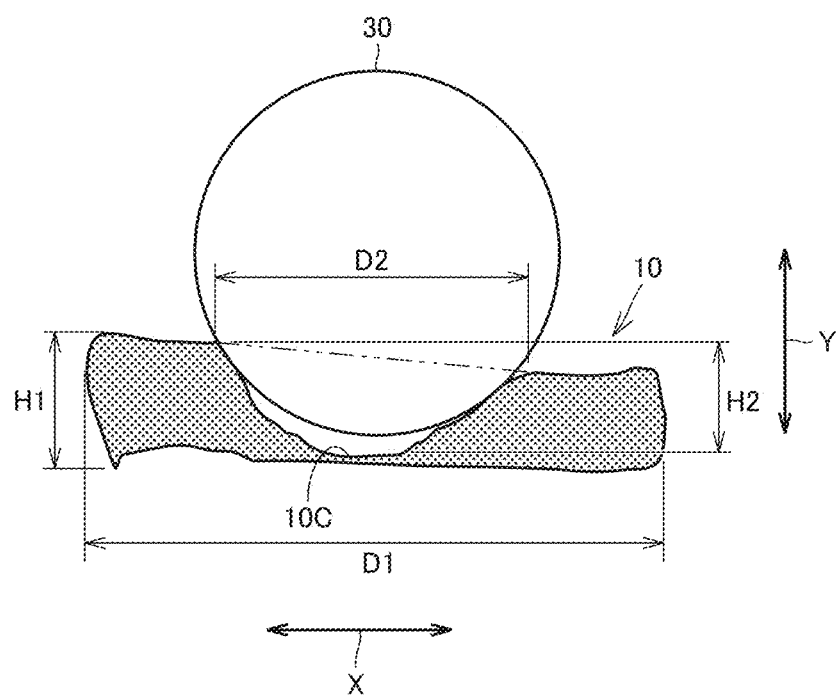
FIG. 12 is a second diagram for illustrating the shape of the joined portion.

In each of the examples shown in FIGS. 11 and 12, an entire width (D1) of joined portion 10 along the X axis direction is about twice or more and six times or less (more preferably, about twice or more and three times or less) as large as a width (D2) of notch portion 10C along the X axis direction. Further, a difference (H1–H2) between an entire width (H1) of joined portion 10 and a width (H2) of notch portion 10C along the Y axis direction is about 1.4 times or more and 4 times or less (more preferably, about 1.4 times or more and 1.7 times or less) as large as a plate thickness (T) of bus bar 300 (second member).

By adjusting the dimensional relation between joined portion 10 and notch portion 10C to fall within the above-described range, the influence of heat upon formation of joined portion 10 can be effectively reduced while suppressing decreased joining strength. By reducing the influence of heat, insufficient joining can be suppressed from occurring due to residual strain in joined portion 10.

It should be noted that when fine irregularities exist in the contour of joined portion 10 as in the example of FIG. 12, each of the entire widths (D1, H1) of joined portion 10 is basically intended to mean a dimension at a position at which the width is maximum; however, extreme irregularities that do not substantially contribute to increase or decrease of the area of joined portion 10 are not included in the entire width (D1, H1) of joined portion 10. Regarding this point, the same applies to the widths (D2, H2) of notch portion 10C.

As shown in the example of FIG. 12, notch portion 10C may be formed to avoid a hole portion 30 provided in the member in which joined portion 10 is formed. The shape of the contour of notch portion 10C is not limited to part of a substantially quadrangular shape, substantially circular shape, or substantially oval shape (substantially elliptical shape), and notch portion 10C may have a contour with fine irregularities as shown in FIG. 12, or may have a polygonal shape such as a triangular shape.

The member-joined structure according to the present technology is not limited to the above-described example of joined portion 10 of electrode terminal 110 and bus bar 300. For example, the present technology can also be applied to a joined portion of a bus bar and a voltage detection wire in the battery module. Further, although electrode terminal 110 and bus bar 300 are typically metal members, the present technology can also be applied to a joined portion including a resin member.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery module, comprising:
a plurality of battery cells arranged along a first direction, each of the plurality of battery cells including an electrode terminal as a first member; and
a bus bar as a second member having a shape of plate, the second member including;
an overlapping portion that overlaps with the first member, and
a protruding portion that protrudes from the overlapping portion along the first direction, wherein
the overlapping portion includes a joined portion in which the first member and the second member are joined to each other by welding or fusing, and
the joined portion is provided with a notch portion having a contour located opposite to the protruding portion,
the second member further includes a hole portion in a region located opposite to the protruding portion with respect to the joined portion, and
the notch portion is in the contour of the joined portion to avoid the hole portion.

2. The battery module according to claim 1, wherein an area of a region surrounded by the notch portion is smaller than an area of the joined portion.

3. The battery module according to claim 1, wherein an entire width of the joined portion along a second direction orthogonal to the first direction is twice or more and six times or less as large as a width of the notch portion along the second direction.

4. The battery module according to claim 1, wherein an area of a region surrounded by the notch portion is smaller than an area of the joined portion, and
an entire width of the joined portion along a second direction orthogonal to the first direction is twice or more and six times or less as large as a width of the notch portion along the second direction.

5. The battery module according to claim 1, wherein a difference between an entire width of the joined portion and a width of the notch portion along the first direction is 1.4 times or more and 4 times or less as large as a plate thickness of the second member.

6. The battery module according to claim 1, wherein an area of a region surrounded by the notch portion is smaller than an area of the joined portion, and
a difference between an entire width of the joined portion and a width of the notch portion along the first direction is 1.4 times or more and 4 times or less as large as a plate thickness of the second member.

7. The battery module according to claim 1, wherein an entire width of the joined portion along a second direction orthogonal to the first direction is twice or more and six times or less as large as a width of the notch portion along the second direction, and
a difference between an entire width of the joined portion and a width of the notch portion along the first direction is 1.4 times or more and 4 times or less as large as a plate thickness of the second member.

8. The battery module according to claim 1, wherein an area of a region surrounded by the notch portion is smaller than an area of the joined portion,
an entire width of the joined portion along a second direction orthogonal to the first direction is twice or more and six times or less as large as a width of the notch portion along the second direction, and
a difference between an entire width of the joined portion and a width of the notch portion along the first direction is 1.4 times or more and 4 times or less as large as a plate thickness of the second member.

9. The battery module according to claim 1, wherein the joined portion has a substantially C shape.

10. The battery module according to claim 1, wherein
an area of a region surrounded by the notch portion is smaller than an area of the joined portion, and
the joined portion has a substantially C shape.

11. The battery module according to claim 1, wherein
an entire width of the joined portion along a second direction orthogonal to the first direction is twice or more and six times or less as large as a width of the notch portion along the second direction, and
the joined portion has a substantially C shape.

12. The battery module according to claim 1, wherein
a difference between an entire width of the joined portion and a width of the notch portion along the first direction is 1.4 times or more and 4 times or less as large as a plate thickness of the second member, and
the joined portion has a substantially C shape.

13. The battery module according to claim 1, wherein
the notch portion is within the contour of the joined portion and does not overlap the hole portion in a direction orthogonal to the first direction.

14. A battery pack, comprising:
a case; and
a battery module being accommodated in the case, wherein the battery module comprises:
  a plurality of battery cells arranged along a first direction, each of the plurality of battery cells including an electrode terminal as a first member, and
  a bus bar as a second member having a shape of plate, the second member including:
    an overlapping portion that overlaps with the first member, and
    a protruding portion that protrudes from the overlapping portion along the first direction, wherein
the overlapping portion includes a joined portion in which the first member and the second member are joined to each other by welding or fusing, and the joined portion is provided with a notch portion having a contour located opposite to the protruding portion,
the second member further includes a hole portion in a region located opposite to the protruding portion with respect to the joined portion, and
the notch portion is in the contour of the joined portion to avoid the hole portion.

15. The battery pack according to claim 14, wherein
the notch portion is within the contour of the joined portion and does not overlap the hole portion in a direction orthogonal to the first direction.

16. A battery module, comprising:
a plurality of battery cells arranged along a first direction, each of the plurality of battery cells including an electrode terminal;
a bus bar, as a first member, being connected to the electrode terminal; and
a voltage detection wire, as a second member, being connected to the bus bar, the second member including:
  an overlapping portion that overlaps with the first member, and
  a protruding portion that protrudes from the overlapping portion along the first direction, wherein
the overlapping portion includes a joined portion in which the first member and the second member are joined to each other by welding or fusing,
the joined portion is provided with a notch portion having a contour located opposite to the protruding portion,
the second member further includes a hole portion in a region being located opposite to the protruding portion with respect to the joined portion, and
the notch portion is in the contour of the joined portion to avoid the hole portion.

17. The battery module according to claim 16, wherein
the notch portion is within the contour of the joined portion and does not overlap the hole portion in a direction orthogonal to the first direction.

\* \* \* \* \*